(12) United States Patent
Sunata

(10) Patent No.: US 8,650,099 B2
(45) Date of Patent: Feb. 11, 2014

(54) MANAGEMENT SYSTEM, MANAGEMENT APPARATUS AND METHOD FOR THE SAME

(75) Inventor: Jin Sunata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 144 days.

(21) Appl. No.: 12/691,538

(22) Filed: Jan. 21, 2010

(65) Prior Publication Data

US 2010/0191620 A1 Jul. 29, 2010

(30) Foreign Application Priority Data

Jan. 27, 2009 (JP) .................................. 2009-015319

(51) Int. Cl.
*G06Q 10/00* (2012.01)
*G03G 15/00* (2006.01)

(52) U.S. Cl.
USPC .............................................. 705/28; 399/24

(58) Field of Classification Search
USPC .............................................. 705/28; 399/24
See application file for complete search history.

(56) References Cited

U.S. PATENT DOCUMENTS

| 2003/0050873 | A1 | 3/2003 | Niki | |
|---|---|---|---|---|
| 2003/0200035 | A1* | 10/2003 | Niki | 702/33 |
| 2008/0144975 | A1* | 6/2008 | Shibaki et al. | 382/299 |
| 2008/0298860 | A1* | 12/2008 | Omata | 399/321 |
| 2009/0041484 | A1* | 2/2009 | Kitagawa et al. | 399/43 |

FOREIGN PATENT DOCUMENTS

JP 2003-159854 A 6/2003

* cited by examiner

*Primary Examiner* — Ryan Zeender
*Assistant Examiner* — Kristie A Mahone
(74) *Attorney, Agent, or Firm* — Canon USA, Inc., IP Division

(57) ABSTRACT

A consumables stock subtraction processing unit in a management apparatus calculates a counter value used in the determination of stock subtraction for a consumable product by using the value of a counter included in a residual amount notification acquired from an image formation apparatus. When the difference of the determination counter value calculated upon receipt of a previous residual amount notification and a determination counter value calculated upon receipt of a new residual amount notification is greater than or equal to a predetermined value, stock subtraction processing for the consumable is performed.

6 Claims, 12 Drawing Sheets

FIG.7

DETAILED CONSUMABLE INFORMATION (701)

MODEL — PRINTER-0002
CONSUMABLE NAME — TONER CLEAR-001
CONSUMABLE COLOR — CLEAR (TRANSPARENT)

| COUNTER NUMBER (702) | USE (703) | PARAMETER (704) |
|---|---|---|
| 50 | ✓ | 0.2 |
| 51 | ✓ | 1 |
| 52 | ✓ | 15 |

[UPDATE] (705)  [NOT UPDATED] (706)

$Cnt = CntA \times \alpha + CntB \times \beta + CntC \times \gamma$

DETAILED CONSUMABLE INFORMATION

MODEL          PRINTER-0002

CONSUMABLE NAME    TONER CLEAR-001

CONSUMABLE COLOR    CLEAR (TRANSPARENT)

| COUNTER NUMBER | USE | PARAMETER (1202) | CORRECT PARAMETER (1203) |
|---|---|---|---|
| 50 | ☑ | 0.2 | ☑ |
| 51 | ☑ | 1 | ☑ |
| 52 | ☑ | 15 | ☐ |

[UPDATE] (1204)    [RESET] (1205)

MANAGEMENT SYSTEM, MANAGEMENT APPARATUS AND METHOD FOR THE SAME

BACKGROUND OF THE INVENTION

1. Field of the Invention

The present invention relates to a technique of stock management for consumables used in an image formation apparatus.

2. Description of the Related Art

A conventional consumables stock management system applies a stock subtraction operation to consumables using a notification indicating that there is a low residual amount (toner low notification) or no residual amount (toner empty notification) of a recording material (toner, ink or the like) that is a consumable. The above notification is hereinafter referred to as residual amount notification.

However, a method which detects a residual amount of a recording material in a printing apparatus may generate signals indicating a low residual amount in the printing apparatus which exceed a notification threshold by a plurality of times, around the time when the residual amount of recording material reaches the notification threshold. Consequently if a unit stock subtraction operation for a consumable is performed by a management apparatus corresponding to individual residual amount notification signals, accurate consumables stock management can not always be conducted.

For example, printing in an image formation apparatus to which a cartridge supplies consumables may be recommenced by a user removing the cartridge from the print apparatus and shaking the cartridge. In this case, a plurality of low residual amount signals is produced in the apparatus in a short period. Namely, a plurality of residual amount signals is output for a single cartridge (consumable). Consequently the problem arises that accurate stock management is not achieved.

Japanese Patent Application Publication No. 2003-159854 is proposed to solve the above problem. Publication No. 2003-159854 discusses a method by which, based on the number of sheets printed, a stock subtraction operation is not performed when the number of printed sheets is lower than a predetermined number in the interval from the production of a signal to the production of an immediately subsequent signal, or when a notification is received within a predetermined time period.

However while the above conventional method avoids erroneous detection, it entails the following problem which will be discussed below using an example of toner as a recording material.

When color toner having a plurality of specific output patterns is used, a certain output pattern may result in a large deviation in the actual toner consumption amount and the printed number of pages.

For example, a glossy finish similar to a photograph may be produced by applying transparent clear toner to a sheet of paper such as a color print. Printing operations using clear toner may apply clear toner to the whole sheet surface to form an output pattern, which consumes a large amount of clear toner in a single operation (whole surface printing). There are also output patterns producing a glossy finish for images in which a print product is produced using different toner and clear toner printing is only partially applied to the images in the print product.

Partial output patterns also use clear toner to print letters and data (for example, company logos) which are registered in a predetermined form like watermarks.

When using whole surface printing as discussed above, while a counter is incremented by a value of "1" with respect to a single printing operation for a single page, an amount of toner consumption is high, which corresponds to several pages in comparison to other partial printing methods. In other words, application of a normal counter setting when using whole surface printing does not keep pace with the relationship between toner consumption amount and print operations using other output patterns. Consequently when a counter value corresponding to a number of printed sheets is measured in a conventional manner using color information (color/monochrome), the conventional relationship between the counter number and the actual toner consumption amount does not hold with respect to clear toner.

Conventional determination methods entail the following problems when they are applied to an apparatus realizing a plurality of output patterns in which there is a wide variation in the used amount of recording material of a specific color.

For example, when printing operations are performed biased toward a specific use, there is a considerable difference between the actual consumption amount and the measured consumption amount represented by the counter value as to the number of printed pages.

As discussed above, a predetermined value may be provided with reference to a number of sheets which can be printed between signals, to thereby detect erroneous notification. The predetermined value is set based on the printable number of sheets predetermined for each consumable. For example, the value "1/10" for a printable sheet number may be set as the predetermined number.

In this regard, repetition of solid printing (whole surface printing) may be performed or printing may be performed in which several times the amount of recording material is consumed in comparison with other output patterns and the actual recording material in the consumable is consumed and runs out even when a low number of pages are printed. Further, a user may repeat printing with an output pattern which consumes a low amount of toner, or may carry out a plurality of different output patterns. Thus, conventional methods entail the risk that a correct residual amount notification may be determined to be an erroneous notification, thereby resulting in erroneous control such as incorrect stock subtraction and suitable stock management cannot be conducted.

SUMMARY OF THE INVENTION

The present invention is directed to executing suitable stock management by suppressing errors in stock subtraction processing of consumables in stock management in an image formation apparatus, which can perform printing processing in which a consumption amount of a recording material as a consumable widely varies.

According to an aspect of the present invention, a management system is configured to manage a stock of consumables used in an image formation apparatus which includes a first counter configured to count a sheet number of images formed in a first mode using a specified recording material, a second counter configured to count a sheet number of images formed using the specified recording material in a second mode in which more of the recording material is used than the first mode, a detection unit configured to detect a residual amount of the recording material in the consumable, and a communication unit configured to send to the management apparatus a residual amount notification in accordance with the residual amount of the recording material detected by the detection unit, together with a counter value for a first counter and a counter value for a second counter, and a management apparatus includes an acquisition unit configured to acquire the residual amount notification from the image formation apparatus, a decision unit configured to decide a counter value used in the determination of stock subtraction for the consumable using the first counter value and the second counter value notified together with the residual amount and acquired by the acquisition unit, a determination unit configured to determine whether a difference of a counter value decided by the decision unit upon receipt of a historical residual amount notification and a counter value decided by the decision unit upon receipt of a new residual amount notification is greater than or equal to a predetermined value, and a processing unit configured to perform stock subtraction processing on the consumable when the determination unit determines that the difference is greater than or equal to a predetermined value.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of a consumables detailed information screen.

FIG. 12 illustrates an example of a consumables detailed information screen according to a second embodiment of the present invention.

DESCRIPTION OF THE EMBODIMENTS

Various exemplary embodiments, features, and aspects of the invention will be described in detail below with reference to the drawings.

Figure 1:
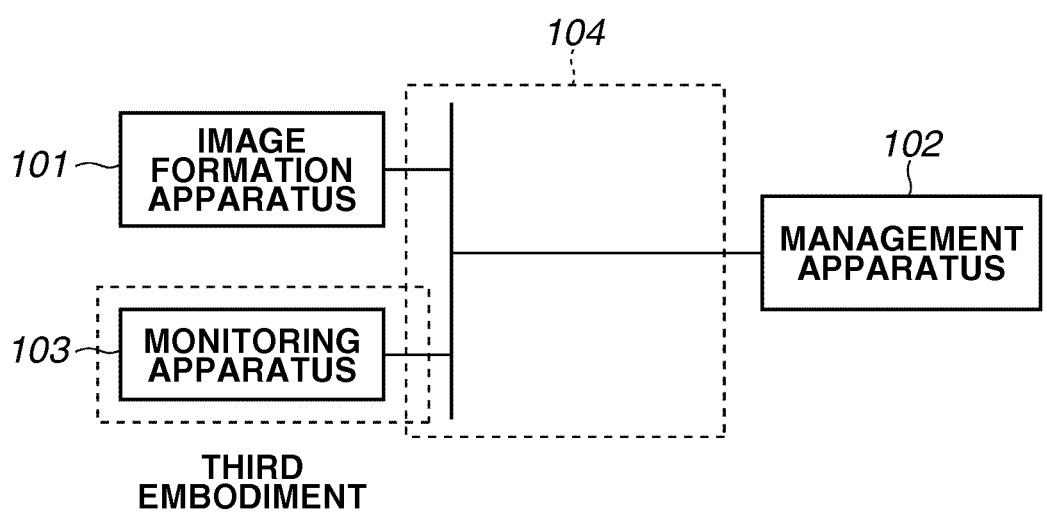
FIG. 1 is a block diagram illustrating an arrangement of a consumables stock management system according to a present embodiment.

FIG. 1 is a block diagram illustrating an arrangement of a consumables stock management system according to a present embodiment. A management apparatus 102 is configured to manage consumables in an image formation apparatus which is under management and is connected through a network 104 to the image formation apparatus 101. The image formation apparatus 101 can notify the management apparatus 102 of the state of a consumable in the image formation apparatus 101 via the network 104. The network 104 may be either a local area network (LAN) or a dedicated line or the Internet.

When the image formation apparatus 101 is not provided with a function of notifying to the management apparatus 102, a monitoring apparatus 103 may be connected in the same network 104. The monitoring apparatus 103 may monitor the state of consumables in the image formation apparatus 101 and may notify the state of such consumables to the management apparatus 102 through the network 104. The monitoring apparatus 103 will be discussed in detail in the third embodiment.

Figure 2:
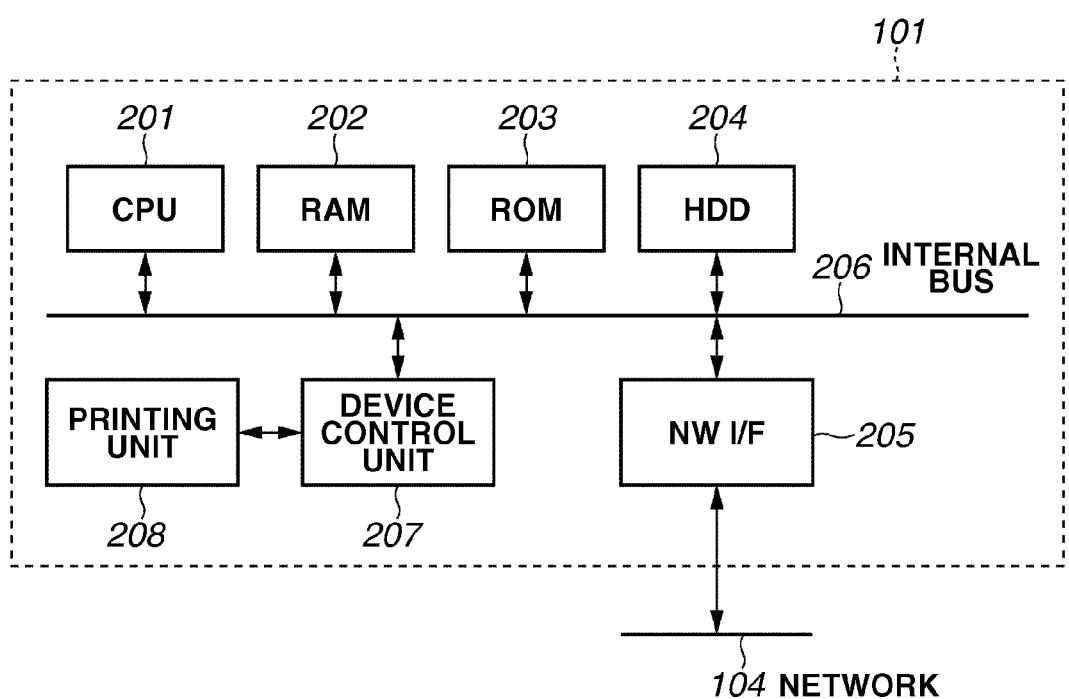
FIG. 2 illustrates an arrangement of an image formation apparatus provided with an information processing device according to the present embodiment of the present invention.

FIG. 2 illustrates an arrangement of an image formation apparatus 101 provided with an information processing device according to the exemplary embodiment of the present invention.

The image formation apparatus 101 may be a digital multifunction peripheral, facsimile apparatus, laser beam printer, inkjet printer and scanner apparatus.

Figure 4:
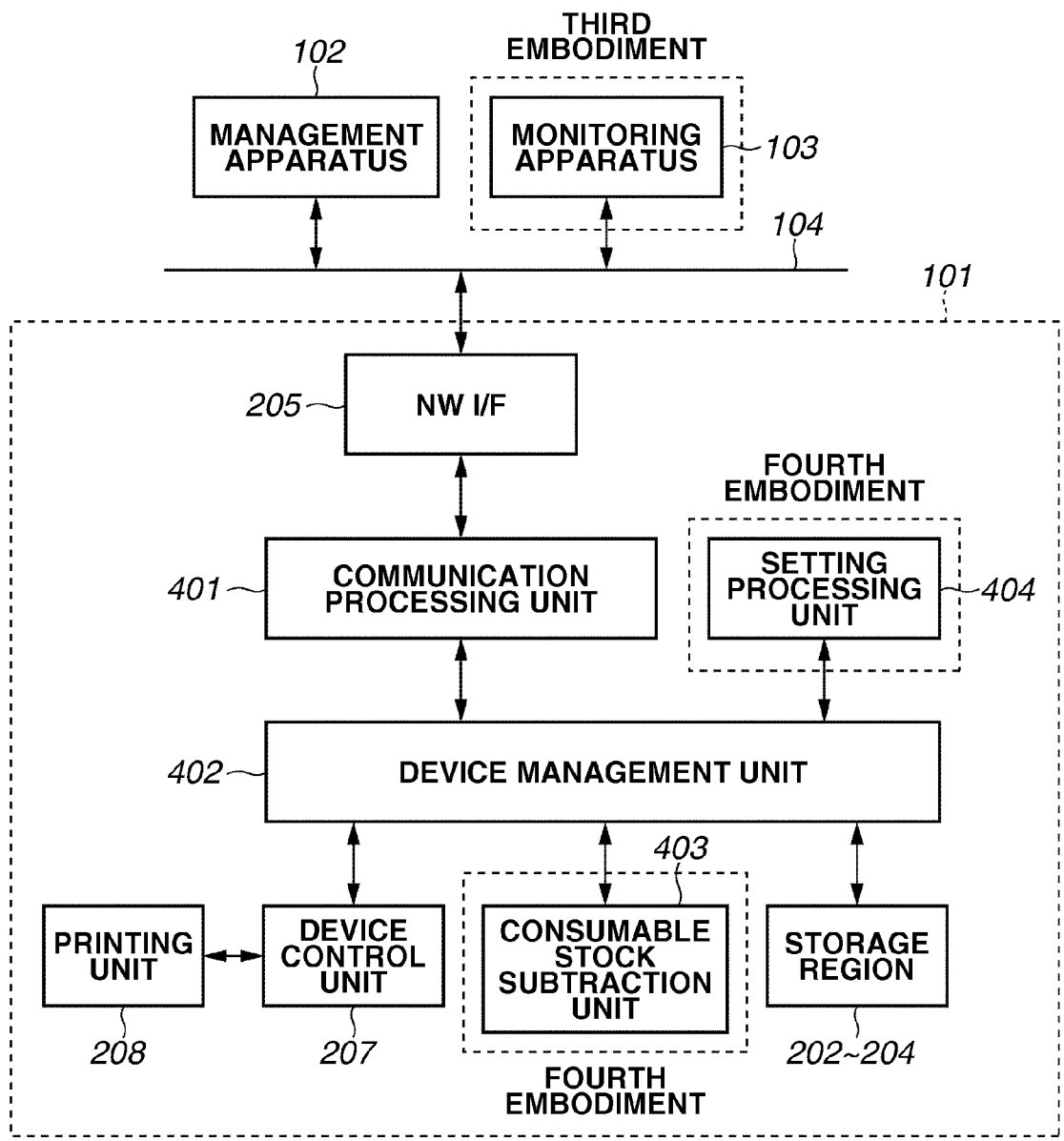
FIG. 4 is a functional block diagram illustrating processing modules (hereafter "processing unit") in an image formation apparatus.

As illustrated in FIG. 2, the image formation apparatus 101 is provided with a central processing unit (CPU) 201 configured to implement programs stored in a read-only memory (ROM) 203 (including programs for realizing various types of processing as illustrated in FIG. 4 below). The CPU 201 implements overall control of each device via an internal bus 206.

In the image formation apparatus 101, the CPU 201, a random access memory (RAM) 202, the ROM 203, a storage device 204, a device control unit 207, a printing unit 208 and various devices for the network interface 205 are connected by an internal bus 206. The storage device 204 for example may be a non-volatile memory or a hard disk device (HDD).

The RAM 202 functions as a work area or a memory for the CPU 201. The RAM 202 is a backup RAM which can save information including counter information, system information and status information as discussed below even after the power of the image formation apparatus 101 is switched OFF.

The device control unit 207 controls the printing unit 208. The network interface (NW I/F) 205 handles both input and output data for an external network device or personal computer (PC).

The storage device 204 functions as an external storage device and in addition to image data, for example, can store information including counter information, system information and status information as discussed below in place of the backup RAM 202. The CPU 201 stores image data in a storage medium such as the storage device 204.

The device control unit 207 and the printing unit 208 monitor and control the state of consumables used by the image formation apparatus 101. For example, the printing unit 208 has a sensor (not illustrated) which enables detection of a residual amount of a recording material such as toner stored in the image formation apparatus 101. When the residual toner amount is low or nil, a signal to that effect is transmitted to the CPU 201 through the device control unit 207.

The CPU 201 notifies the management apparatus 102 of the state of the consumables received from the device control unit 207, via the network 104 from the network interface 205.

Figures 8, 9:
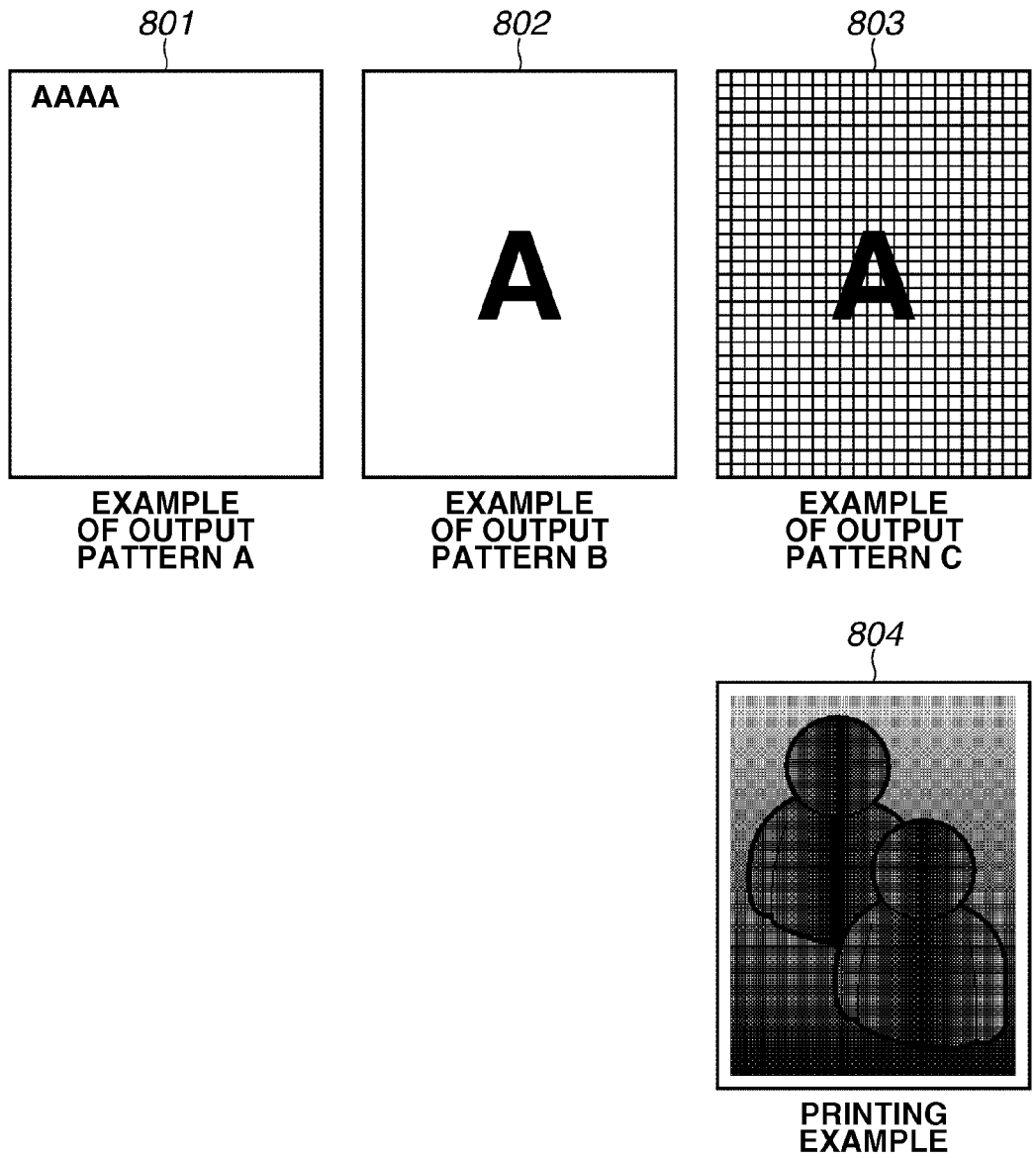
FIG. 8 illustrates an example of an output pattern (toner consumption amount pattern) corresponding to counter numbers 50-52.
FIG. 9 illustrates a correction summation method for each counter.

The printing unit 208 is provided with printing agent (clear toner) for use in adjusting a level of glossiness and can perform printing of output patterns as illustrated in FIG. 8 hereafter in a printing job.

The consumables stock subtraction processing unit 403 and the setting processing unit 404 will be discussed in detail in the fourth embodiment hereafter.

Figure 3:
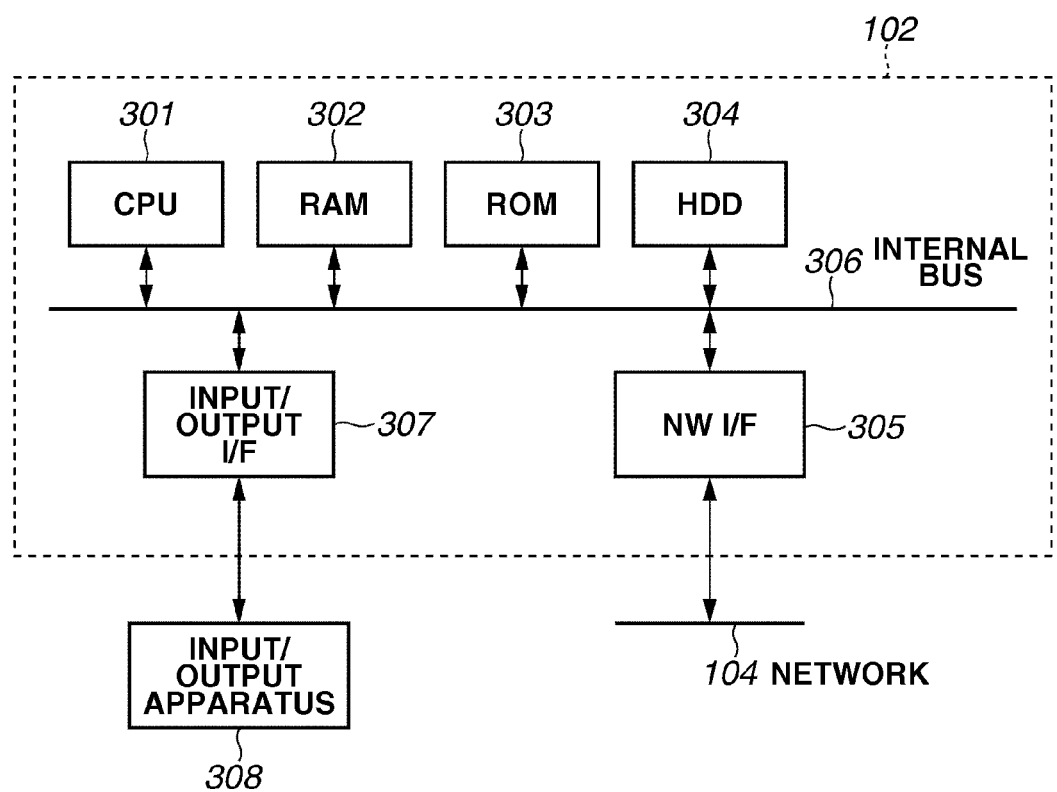
FIG. 3 illustrates an arrangement of a management apparatus provided with an information processing device according to the present embodiment of the present invention.

FIG. 3 illustrates a management apparatus 102 provided with an information processing device according to the present embodiment of the present invention.

The management apparatus 102 is an apparatus which manages and monitors the image formation apparatus 101 and, for example, may be applied to an information processing device such as a PC, a server or the like.

Figure 5:
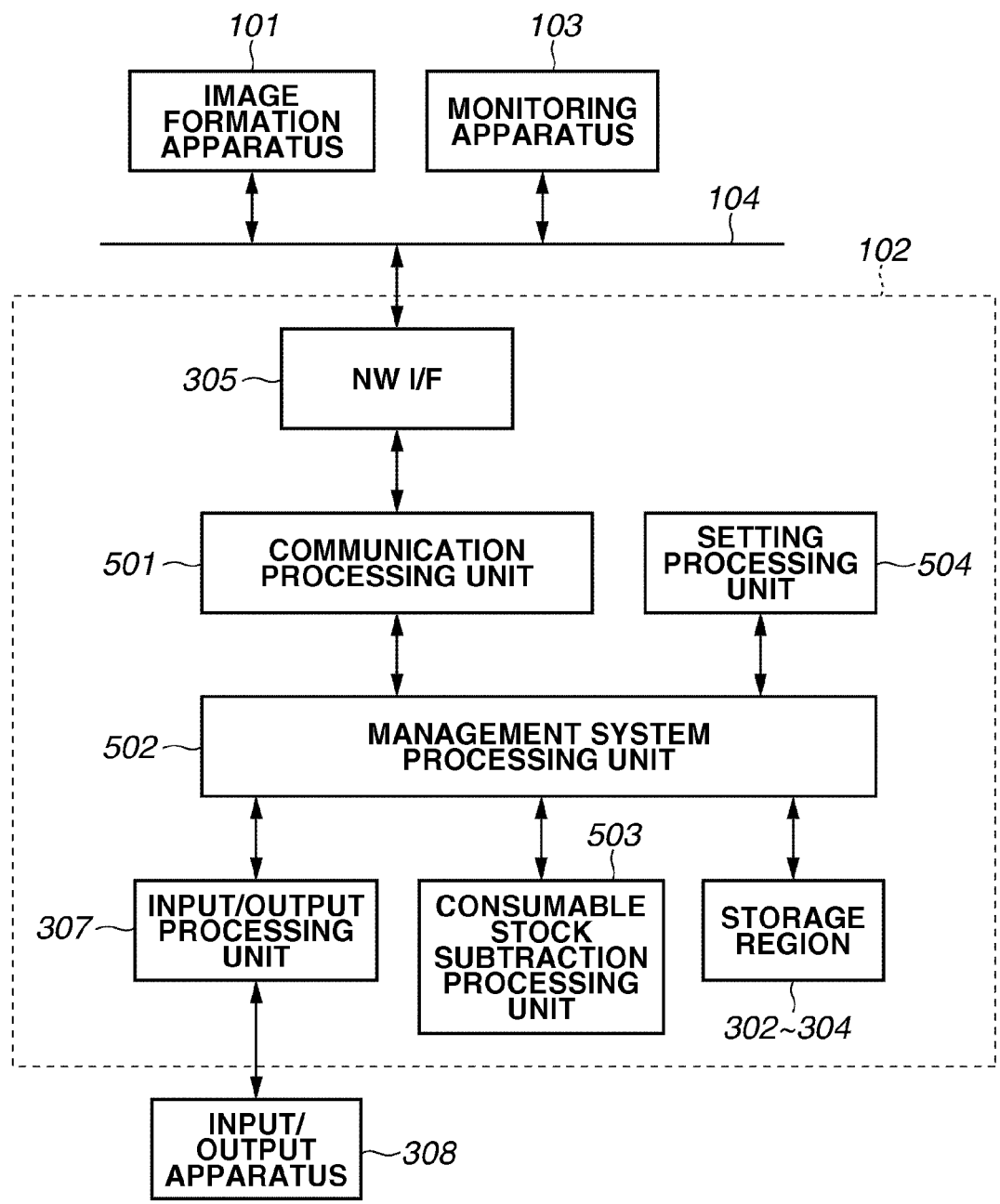
FIG. 5 is a functional block diagram illustrating processing units in a management apparatus.

As illustrated in FIG. 3, the management apparatus 102 is provided with a CPU 301 configured to implement programs stored in a ROM 303 (including programs for realizing various types of processing as illustrated in FIG. 5 below). The CPU 301 implements overall control of each device via an internal bus 306.

In the management apparatus 102, the CPU 301, RAM 302, ROM 303, non-volatile memory or HDD 304 (storage device), various devices for the network interface (NW I/F) 305 are connected by the internal bus 306.

The NW I/F 305 handles both input and output data with an external network device or PC including an image formation apparatus 101 through the network 104.

The storage device 304 functions as an external storage device and in addition to recorded information in the image formation apparatus 101, the storage device 304 can store information including counter information, system information and status information as discussed below.

An input/output interface 307 configured to set and manage the management apparatus and an input/output apparatus 308 such as a display, keyboard or mouse connected to the interface 307 are provided in the management apparatus 102. In addition to the input/output apparatus 308, the management apparatus 102 can provide the same user interface (UI) functions to a separate information processing device through the network 104. For example, the management apparatus 102 can perform settings or management operations externally by using a program to communicate with an external apparatus using a protocol such as hypertext transfer protocol (HTTP).

Next, with reference to FIG. 4 and FIG. 5, a method will be described by which the management apparatus 102 manages information about consumables used in the image formation apparatus 101.

FIG. 4 is a functional block diagram illustrating processing modules (hereafter "processing unit") in an image formation apparatus 101. Those components which are the same as those in FIG. 2 are denoted by the same reference numerals.

FIG. 5 is a functional block diagram illustrating processing units in a management apparatus 102. Those components which are the same as those in FIG. 3 are denoted by the same reference numerals. Since the management apparatus 102 is often formed by information processing devices such as personal computers or servers, the processing units 501-504 illustrated in FIG. 5 can be simply realized by programs and can be applied without modification to the monitoring apparatus 103 (third embodiment).

A communication processing unit 401 in the image formation apparatus 101 controls the network interface 205 in the image formation apparatus 101 and connects the image formation apparatus 101 with the management apparatus 102 or the monitoring apparatus 103 through the network 104. Furthermore, the communication processing unit 401 may exchange necessary information with the external management apparatus 102 or the monitoring apparatus 103 (third embodiment) in accordance with instructions from the device management unit 402. The device management unit 402 controls the overall operation of the image formation apparatus 101.

The communication processing unit 401 can use a general communication protocol to notify the management apparatus 102 or the monitoring unit 103 of the state of the image formation apparatus 101 or conversely receive data from the management apparatus 102 or the monitoring unit 103. For example, a communication protocol includes protocols such as simple mail transfer protocol (SMTP) or HTTP.

Next, the device management unit 402 will be described. The device management unit 402 is configured to manage and control the overall operation of the image formation apparatus 101 as described above. The device management unit 402 issues instructions to the printing unit 208 through the device control unit 207 and acquires information produced by the printing unit 208. Such information includes information relating to printing completion, printing paper out, mounting state of consumables required for printing and residual amount of consumables. Furthermore, the device management unit 402 handles printing based on the above information and prompts replacement of consumables.

The device management unit 402 analyzes a printing mode (illustrated in FIG. 8 hereafter) contained in the print job received from an information processing device such as a personal computer and increments a counter according to the printing mode. A counter is provided for each printing mode and is stored in the backup RAM 202 or the storage device 204.

The device management unit 402 sends a residual amount notification to the management apparatus 102 through the communication processing unit 401. The residual amount notification is based on a signal showing a low residual amount or empty of residual amount of the recording material in the consumable and is sent from the printing unit 208 via the device control unit 207. When a residual amount notification of clear toner is sent to the communication processing unit, the device processing unit 402 includes a counter value representing the count for each printing mode as above described in the clear toner residual amount notification and sends the notification to the communication processing unit 401. While the counter value is included in the residual amount notification, the notifications may also be sequentially sent in association with time or identification information, respectively.

The above processing is enabled by programs stored in the RAM 203 or the storage device 204 illustrated in FIG. 2, which realize the communication processing unit 401 or the device management unit 402. These programs are executed by the CPU 201 and information may be read into or read out of the ROM 203 or the storage device 204 as required.

The device management unit 402 not only operates on the basis of predefined information but also may exchange information with the consumable stock subtraction processing unit 403 (fourth embodiment) and the setting processing unit 404 (fourth embodiment), which vary and manage settings for the image formation apparatus 101 via the network 104. The device management unit 402 performs notification to the management apparatus 102 and the monitoring apparatus 103 (third embodiment) regarding the settings or the state of a consumable and conversely can return the settings or state as required.

Next, the respective processing units of the management apparatus 102 will be described with reference to FIG. 5.

A communication processing unit 501 in the management apparatus 102 connects the management apparatus 102 with the image formation apparatus 101 or the monitoring apparatus 103 via the network 104 by controlling the network interface 305.

The communication processing unit 501 exchanges necessary information with the external monitoring apparatus 103 or image formation apparatus 101, which is monitored in accordance with instructions from the management system processing unit 502. The management system processing unit 502 is configured to control the overall operation of the management apparatus 102.

The communication processing unit 501 can use a general communication protocol such as SMTP or HTTP to receive notifications from the image formation apparatus 101 or send data to the image formation apparatus 101.

The consumables stock subtraction processing unit 503 manages consumables in accordance with information about consumables notified from the image formation apparatus 101.

The setting processing unit 504 performs settings for information required for managing the consumables discussed above and settings for the respective systems. The setting processing unit 504 is linked with the storage region (RAM 302, ROM 303, HDD 304) to enable storage and processing of stock information about consumables or set information.

The setting processing unit 504 can display settings and record or change set information by using the input/output apparatus 308 such as a display, keyboard or mouse via the management system processing unit 502 or input/output processing unit (input/output I/F) 307.

Although the above respective processing units operate through programs, a part of the functions can be prepared and carried out in a controller.

Next, a method of realizing the consumable stock subtraction processing unit 503 and the setting processing 504 will be described using the flowchart and the screen examples in FIG. 6 to FIG. 11.

Figure 6:
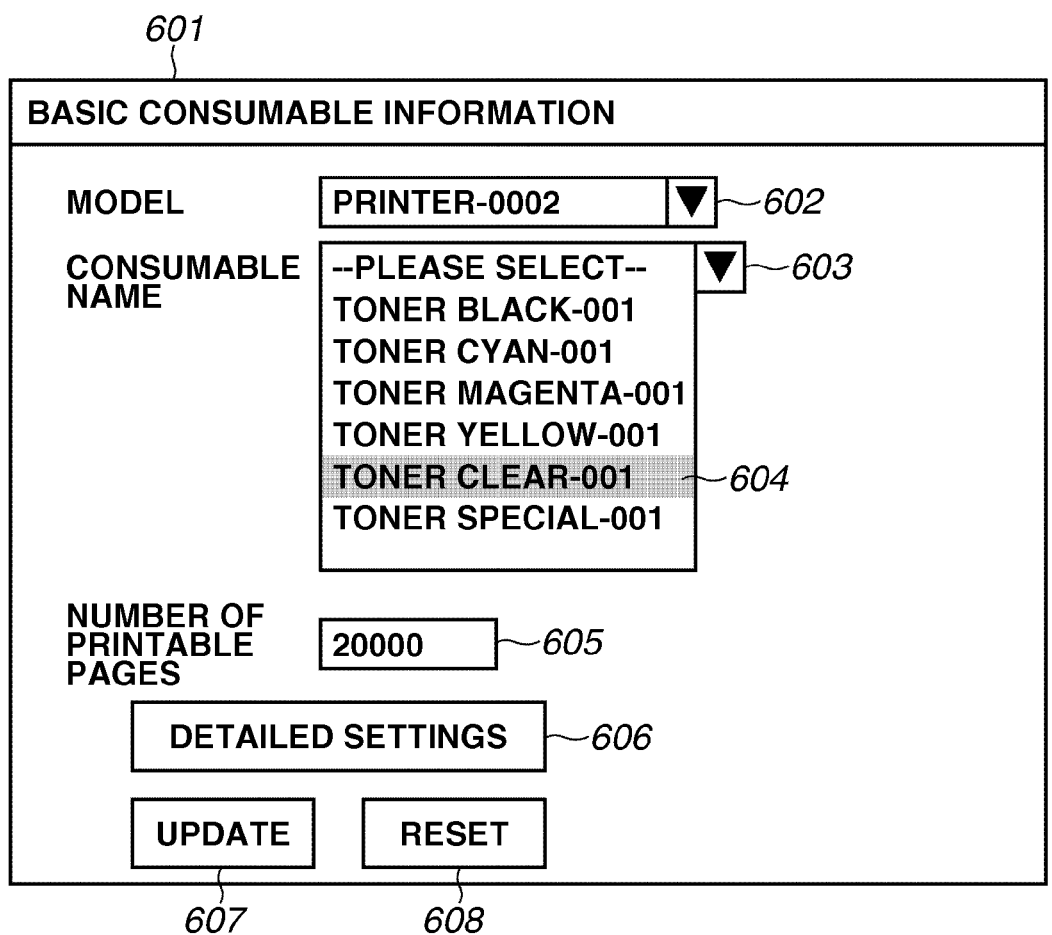
FIG. 6 illustrates an example of a consumables basic information screen.

FIG. 6 illustrates an example of a consumables basic information screen. In FIG. 6, a consumables basic information screen 601 performs display operations through an input/output apparatus 308 under control of the setting processing unit 504 in response to user instructions input through the input/output apparatus 308. Settings for consumables basic information can be made using the consumables basic information screen 601.

The consumables basic information screen 601 enables management of a consumable with minimum units used in consumables stock management. This is because one new unit of a consumable is to be replenished to make up for decrease of a single stock in the consumables management. Normally, a unique type name is defined corresponding to a single consumable.

A method of setting consumable basic information and the arrangement of the consumables basic information screen 601 will be described below. The consumables basic information screen 601 enables a user to select various types of information 602 from a list making use of the input/output apparatus 308. Then, a user selects a type name 603 for a consumable tied to the model type information 602, from the list.

When a consumable 604 is specified by the selection function of the type name 603 for the consumable, under control of the setting processing unit 504, a number of printable sheets prepared in the selected consumable 604 is applied (displayed) to the printable sheet number field 605. The number of printable sheets is a figure showing the number of sheets which can be printed with a specified output pattern until the consumable runs down. Since the number represents a specified output pattern, the number of printable sheets is termed a nominal printed page number. The printable sheet number field 605 is an input field which can be changed.

The consumables basic information stored in the storage apparatus 304 can be changed according to various information selected or designated on the consumables basic information screen 601 by entering instruction with an update button 608 on the input/output apparatus 308.

The respective information set or selected on the consumables basic information screen 601 can be reset to a state prior to updating by giving instructions using the reset button 608 via the input/output apparatus 308.

A detail setting button 606 is provided in the consumables basic information screen 601. When instructions are entered using the detail setting button 606 via the input/output apparatus 308, the setting processing unit 504 causes the input/output apparatus 308 to display the consumables detailed information screen 701 (FIG. 7) for making a detail setting of consumables indicated by consumable type name 603.

FIG. 7 illustrates an example of a consumables detailed information screen. The consumables detailed information screen 701 is configured to make settings for information used in subtraction processing on indicated consumables.

The consumables processing information linked to the consumables type name and the model name selected on the previous screen (consumables basic information screen 601) is displayed under control of the setting processing unit 504 on the consumables detailed information screen 701.

The counter number 702 means a counter which is incremented in the image formation apparatus 101 in accordance with the method of printing or the paper size when the image formation apparatus 101 is operated. For example, the counter number 51 in the figure illustrates a counter which is incremented when clear-colored toner is printed on a single A4 size page using a first mode. In the example illustrated in the present embodiment, stock management for this consumable is performed using three counter numbers 50, 51, 52.

A checkbox 703 enables selection of whether or not to use the counter for the counter number displayed by the counter number 702. The counter number indicated in the checkbox 703 is the control object of consumables stock management.

A value may be entered into the parameter 704 and the parameter calculated in advance based on the use amount at the time of increment of each counter number is applied as an initial value.

The fact that the parameter of the counter number 50 is smaller compared to the counter number 51 means that the use amount under the increment conditions of the counter number 50 is approximately ⅕ in comparison to the counter number 51.

The fact that the parameter of the counter number 52 is larger compared to the counter number 51 means that the use amount under the increment conditions of the counter number 52 is approximately 15 times the use amount when using the counter number 51.

However, the parameters in the counter numbers 50-52 are configured to vary due to the deviation in the consumables consumption amount resulting from the use conditions of each user. An output pattern example corresponding to the counter numbers 50-52 will be described hereafter.

FIG. 8 illustrates an example of an output pattern (toner consumption amount pattern) corresponding to counter numbers 50-52.

The output pattern example A801, the output pattern example B802 and the output pattern example C803 illustrated in FIG. 8 illustrate an example of an output pattern which can be used when the image formation apparatus 101 uses clear toner (transparent color).

Firstly the output pattern B802 will be described. The output pattern B802 is an output example resembling the output pattern for general letter printing (an output pattern example when forming an image in a first mode). The output pattern B802 is a pattern example in which clear toner (transparent color) is output only in positions where color is outputted on the sheet. In this example, the used amount of clear toner (transparent color) increases in proportion to the use of a consumable having another color. The first mode is a mode in which clear toner is partially output on the sheet.

Next, the output pattern example C803 will be described. The output pattern example C803 is a pattern (an output pattern when an image is formed in a second mode) for which clear toner (transparent color) is output on the entire sheet surface. In this pattern example, the letter "A" illustrates an output pattern such as a letter or figure, and onto the entire scope of the lattice pattern on the sheet surface, clear toner (transparent color) is output. The clear toner is output on the entire sheet surface such that clear toner is applied to the entire range of the sheet in which an image can be formed by the image formation apparatus. More specifically, due to the arrangement of the apparatus, the pattern is output onto substantially the whole sheet surface even when there is a border portion where printing cannot be performed.

In the output pattern example C803, clear toner (transparent color) is output onto the whole graphic print region as illustrated in the printing example 804 so as to obtain a uniform output result in a printed section of the sheet having a glossy or mat finish, and an unprinted section. The consumption amount of clear toner is extremely high in the output pattern example C803 compared with output patterns defined by normal printed sheet numbers.

Finally, the output pattern example A801 will be described. The output pattern example A801 is an output pattern applying clear toner (transparent color) only to a header and a footer (an output pattern when image forming is performed in a third mode). The clear toner (transparent color) at this time is only used in minute amounts on a single printed sheet. This amount is smaller compared to an output pattern using a normal printed sheet number. Only when a plurality of pages is printed, the use amount in this mode matches the use amount per single page when consumables having different colors are used.

Printing modes such as the first to third printing modes are set using a printer driver in the information processing device that generates the print job. For example, a user may carry out printing by selection of any of the first to third printing modes from a printer driver setting screen. In this manner, the printing job in any of the first to third printing modes is produced in the information processing device and sent to the image formation apparatus 101.

A counter which is incremented when implementing the output pattern example A801 (imaging formation in the third mode) is set to 50. Furthermore the counter which is incremented when implementing the output pattern example B802 (imaging formation in the first mode) is set to 51 (first counter). The counter which is incremented when implementing the output pattern example C803 (imaging formation in the third mode) is set to 52 (third counter).

More specifically, the device management unit 402 for the image formation apparatus 101 analyzes the printing mode included in the printing job and increments the counter 51 when using the first mode, increments the counter 52 when using the second mode and increments the counter 50 when using the third mode.

In the consumables stock subtraction processing unit 503 for the management apparatus 102, a correction is applied to each counter so that the increase in each counter notified from the image formation apparatus 101 approximates a counter which is incremented by an output pattern defined by a normal printing sheet number.

For example, when the counter number is 50, the consumable is only used in a header. In this case, a value of "0.2" is applied to the parameter setting field 704 since only approximately 20% of the consumable amount used in the output pattern defined by a normal printed sheet number is used. Thus, by incrementing the counter 50 by a value of 5, a counter increase can be considered as equivalent to printing on a normal single sheet. The figure of 20% is not a general one and varies according to the type of model or consumable.

In an example which is extremely close to a normally printed pattern, the counter number 51 applies "1" as a parameter and the counter is incremented by the same amount as consumables of other colors. In some models, the clear toner (transparent color) is applied more thinly in comparison to consumables of other colors. In this case, a figure such as "0.8" or "0.7" may be applied as the parameter in place of "1".

The counter number 52 consumes large amount of toner consumables and uses several times more toner than normal printing when the counter is incremented by a value of "1". Therefore, a figure of "15" is applied to the parameter. Similar to the counter 51, the counter number 52 can vary the value of the parameter from a figure of "15" according to the amount applicable to other toner types.

As described above, the checkbox 703 is used to decide whether or not to apply the parameter and the counter number in the actual consumables subtraction process to the setting for the parameter 704.

When the checkbox 703 is checked, the counter of the counter number 702 corresponding to the checkbox is used as information for the consumables subtraction process. The counter is handled as a counter value corrected by multiplying the values in the parameter 704 at the time of its use.

In the example illustrated in FIG. 7, since all the checkboxes corresponding to the counter numbers 50, 51, 52 are checked, a consumables subtraction process is performed using the three counter values.

Since each counter may be individually and independently increased in response to the output parameter example, a plurality of patterns may be adapted to counters for a single consumable to summate the overall consumables consumption amount after correcting each counter number.

The printing pattern in FIG. 8 is only an example. Furthermore, color toners including silver and gold colored toners and cyan, magenta and yellow (CMY) toners are applicable in addition to a transparent toner when preparing a plurality of output patterns.

A method of summating corrected values for each counter will be described hereafter with reference to FIG. 9. FIG. 9 illustrates a correction summation method for each counter. In the method illustrated in FIG. 9, respective reference numerals are defined as follows.

Cnt: counter used in consumables stock subtraction determination process (counter for stock subtraction processing determination).

CntA, CntB, CntC: counter prepared for devices for each printing method.

In the example illustrated in FIG. 9:

CntA: value for counter number 50 (third counter value)

CntB: value for counter number 51 (first counter value)

CntC: value for counter number 52 (second counter value)

α: parameter value correcting counter prepared for device in each printing method (In FIG. 7, "0.2") (Third Parameter).

β: parameter value correcting counter prepared for device in each printing method (In FIG. 7, "1") (First Parameter).

γ: parameter value correcting counter prepared for device in each printing method (In FIG. 7, "15") (Second Parameter).

The summation value Cnt is calculated as described below. Firstly a value is calculated by multiplying a parameter "0.2" for the counter number 50 by the value for the counter number 50 and the resulting value is used as a corrected value for the counter number 50. Since the counter number 51 has a parameter of "1", the value of the counter number 51 is used as it is as the corrected value for the counter number 51. Then, a value calculated by multiplying the parameter "15" for the counter number 52 by the value for the counter number 52 is used as the corrected value for the counter number 52.

A value obtained by summating the corrected values for the counter number 50, the counter number 51, and the counter number 52 is used as the summation value Cnt. The value set in the consumables detailed information screen 701 is handled as described above.

Returning now to FIG. 7, when deciding the value to be set in the consumables detailed information screen 701, a user depresses an update button 705. In this manner, the setting processing unit 504 updates the consumables detailed information stored in the storage region 302-304 set on the consumables detailed information screen 701 and returns the screen to the consumables basic information screen 601.

When the value set in the consumables detailed information screen 701 is not applied, the non-update button 706 is depressed. In this manner, the setting processing unit 504 invalidates the value set on the consumables detailed information screen 701 and after returning a state to the one before the updating operation, returns the screen to the consumables basic information screen 601.

Figure 10:
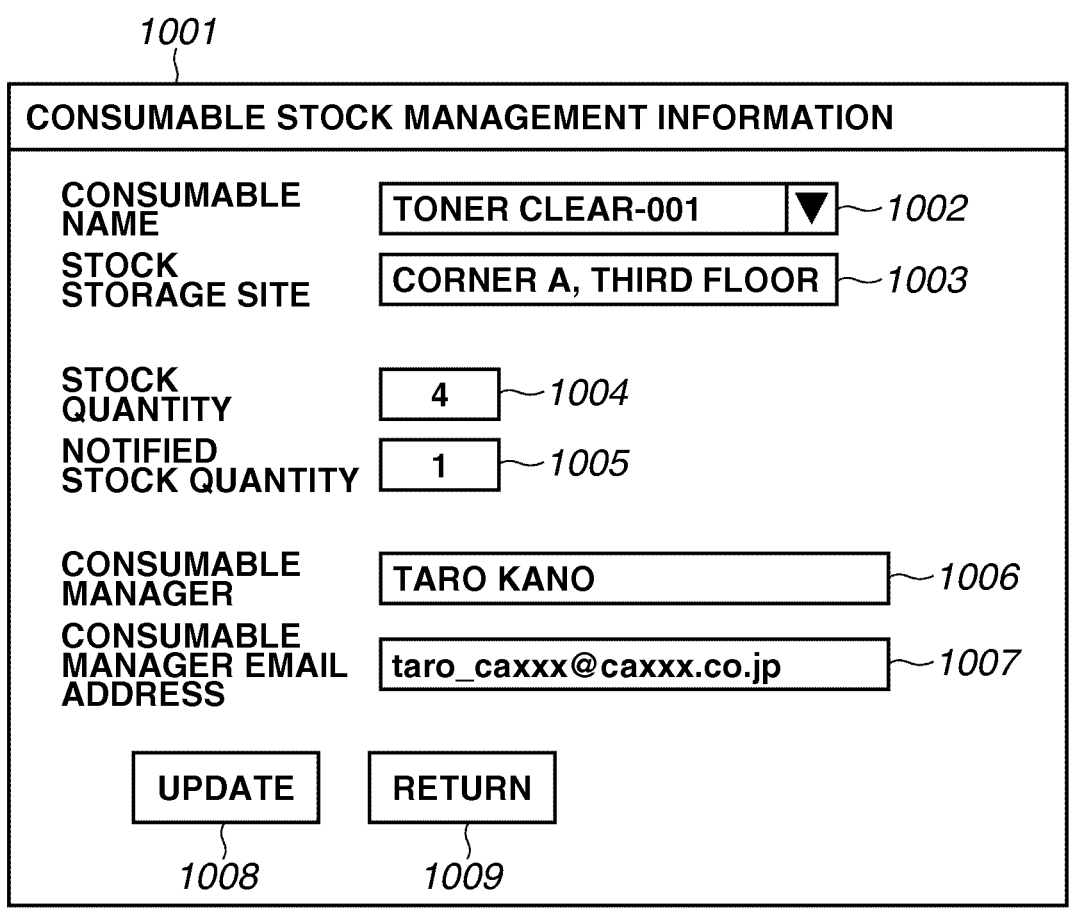
FIG. 10 illustrates an example of a consumables stock management information screen.

Next, consumables stock management will be described with reference to FIG. 10. FIG. 10 illustrates an example of a consumables stock management information screen. In FIG. 10, a consumables stock management information screen 1001 is displayed under control of the setting processing unit 504 in accordance with user instructions input through the input/output apparatus 308.

A user using the image formation apparatus 101 can set stock management information about his consumables on the consumables stock management information screen 1001 as to consumables managed by the management apparatus 102. More specifically, the type name 1002 of the consumable, the stock storage position 1003 of the consumable, the stock number 1004 of the consumable, and the notified stock number 1005 are set as consumables stock management information.

The consumables stock management information screen 1001 includes a consumables manager designation field 1006 and the consumables manager email address designation field 1007.

The consumables manager designation field 1006 designates the user name or department responsible for consumables management when replenishment or replacement of a consumable is required in the image formation apparatus 101. The consumables manager email address designation field 1007 designates the email address of the consumables manager, which is notified to the consumables manager 1006.

The consumables stock management information screen 1001 enables the designations described below depending on the user state. Detailed management settings for managing consumables in each image formation apparatus 101 can be set by handling consumables stock management information with respect to a specified image formation apparatus. Furthermore, the consumables stock management information screen 1001 can be used to perform combined management of a plurality of image formation apparatuses by handling the consumables stock management information for a plurality of the same image formation apparatuses or different image formation apparatuses which use the same consumable. In this case, also when a consumable must be replenished for any one of image formation apparatuses, the manager of a specific consumable can be notified. A user can select an object for management on the consumables stock management information screen 1001, from a not illustrated screen.

Next, the relationship between the management performed by the management apparatus 102 when actually subtracting a consumable, and consumables stock management information set on the consumables stock management information screen 1001 will be described.

The current stock amount of a consumable in the consumables stock site of a user is recorded in the stock number 1004. The notification stock number 1005 is a field configured to designate a number of stocks when the stock of a consumable must be replenished.

Normally, when the stock number 1004 reaches the communication stock number 1005, a delivery is performed by the party handling the consumable or a consumable distribution company to replenish the consumable under control of the consumable stock subtraction processing unit 503. Therefore, by setting the notification stock number 1005 to "1", a user can prevent lacking of sufficient stocks of a consumable for replacement.

When a user uses a plurality of image formation apparatuses using the same consumable, if an extra notification stock number 1005 is set, the user can handle a situation in which replenishment of a consumable must be performed at the same time in a plurality of image formation apparatuses.

When the stock number 1004 for a consumable reaches the notification stock number 1005, the consumables stock subtraction processing unit 503 carries out the delivery of the consumable as described above by transmitting an email to the email address 1007 of the consumable manager. This email contains information including information for the devices required for replenishment of the consumables, for example, the manufacturing number or the name registered for management, the type name of the consumable which must be replaced, or color information as required. With this email, the consumables manager can easily grasp a consumable in an image formation apparatus which should be replaced.

The consumables stock subtraction processing unit 503 sends the email to the email address 1007 of the consumable manager each time the stock number 1004 for the consumable decreases by one.

An update button 1008 is provided on the consumables stock management information screen 1001 and a user depresses the button when updating a setting on the consumables stock management information screen 1001. When the update button 1008 is depressed, the setting processing unit 504 reflects the setting made on the consumables stock management information screen 1001 and updates the consumables stock management information stored in the storage region 302-304.

The return button 1009 is depressed when a user wants to cancel a setting on the consumables stock management information screen 1001. When the return button 1009 is depressed, the setting processing unit 504 terminates the settings on the consumables stock management information screen 1001 without updating the setting.

In the present embodiment, a stock number on which replenishment of consumables stocks is carried out, is set in the notification stock number 1005. However, when a notification stock number 1005 is not set, for example even when the default is set to zero, the consumables stock subtraction processing unit 503 performs the sending process or notification process as described above. Furthermore, even when a value is not designated for the notification stock number 1005, the consumables stock subtraction processing unit 503 may automatically perform sending process or notification process as described above. Or, conversely, the consumables stock subtraction processing unit 503 may not perform the notification when the notification stock number 1005 remains at a value of "0".

The stock subtraction processing for consumables in the present invention using the setting information and processing information as described above will be described using the flowchart in FIG. 11.

Figure 11:
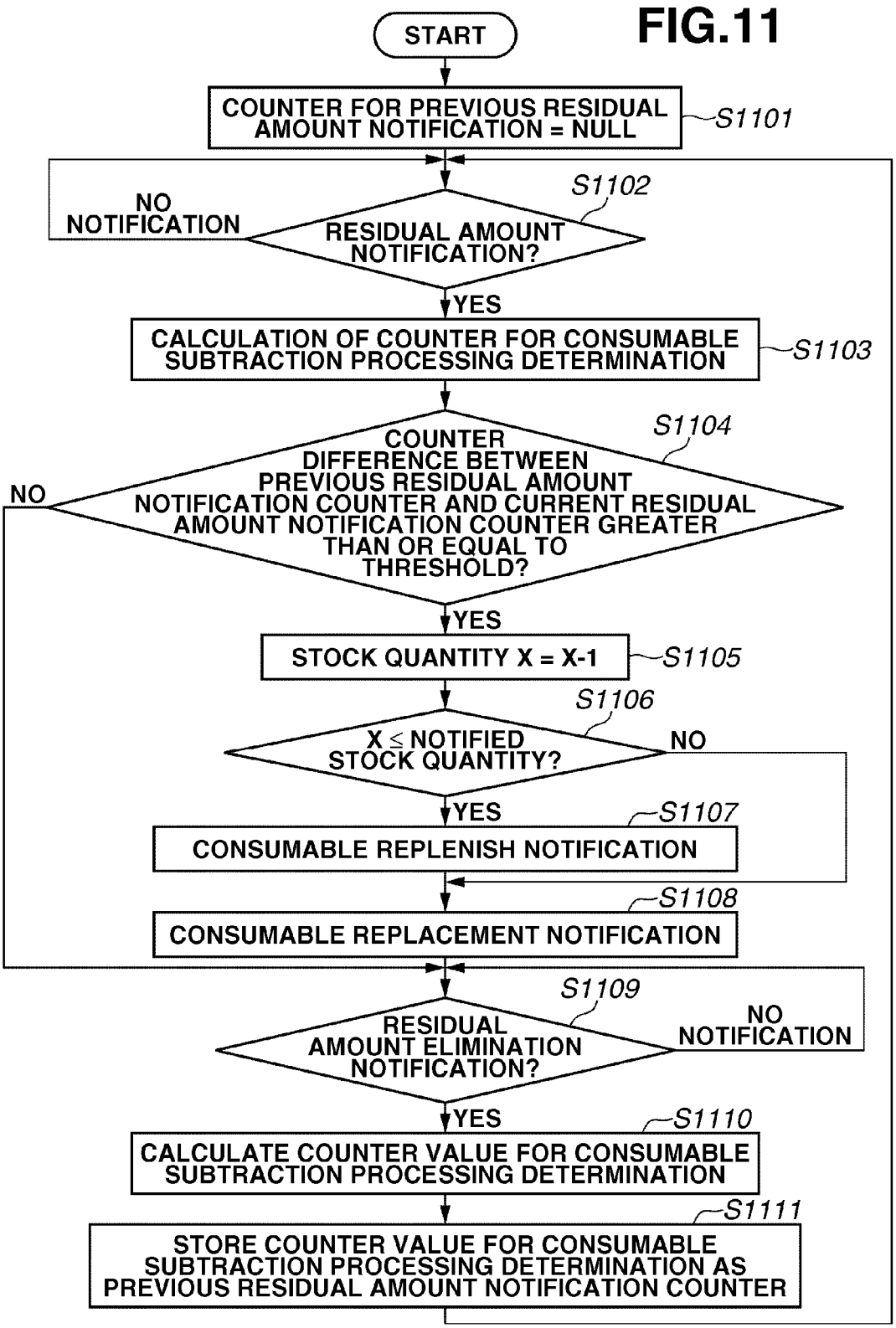
FIG. 11 is a flowchart illustrating a processing example related to stock subtraction of a consumable according to the present invention.

FIG. 11 is a flowchart illustrating an example of a process related to stock subtraction for a consumable according to the present invention. In the first embodiment, the processing implemented in the flowchart is performed in the consumables stock subtraction processing unit 503 of the management apparatus 102. In other words, the processing of the flowchart is performed by the CPU 301 executing programs stored in any of the RAM 302, ROM 303 or storage apparatus 304 of the processing apparatus 102.

Basic information for consumables, the notification stock number, the stock number, the counter number at the time of notifying residual amount, determination information used in stock subtraction processing are recorded in the storage apparatus 304 to avoid their disappearances even when the power supply of the management apparatus 102 is cut out. However, this information may also be recorded in the ROM 303 or in the RAM 302 by using the RAM 302 as a backup RAM.

The stock subtraction processing is a process for a single consumable unit. The stock subtraction processing corresponding to each consumable in the same image formation apparatus is performed independently.

In the present embodiment, clear toner is used as an example of a consumable recording material.

Firstly in step S1101, the consumables stock subtraction processing unit 503 sets NULL as an initial value for the counter for a previous residual amount notification to be stored in the storage apparatus 304. This is because there is no counter for a previous residual amount notification when there has not been any residual amount notification for a consumable from the image formation apparatus 101.

A residual amount notification is a notification sent to the management apparatus 102 from the image formation apparatus 101 when the residual amount of consumable clear toner in the image formation apparatus 101 is zero or satisfies a low condition set in the image formation apparatus 101. The following information is also contained in the residual amount notification.

An individual notification code is included in the notification such as a number expressing that the residual amount of a consumable is zero, a product code for the consumable, information specifying the consumable (for example, a type name of the consumable) and information specifying the image formation apparatus (for example, a uniquely designated device management information for a management, or manufacturing number) Further, a counter value for notification (in a case of clear toner, respective counter values for the counters 50, 51, 52 which are incremented when using clear toner) is included in the residual amount notification. The clear toner counter value is typically "1", however in the present embodiment, a plurality of counter numbers (respective counter values for the counters 50, 51, 52) are provided with respect to the printing pattern.

Next in step S1102, the consumables stock subtraction processing unit 503 is in standby until receiving a residual amount notification from the image formation apparatus 101. When the residual amount notification is received, the consumables stock subtraction processing unit 503 proceeds to step S1103.

In step S1103, the consumables stock subtraction processing unit 503 uses a counter value included in the residual amount notification to decide a counter value used in the determination of the subtraction processing performed on the consumable. At that time, processing is executed in advance with respect to the counter number which is subject to consumables subtraction processing as described above. Herein, as shown in FIG. 9, the respective counter values of the counter numbers 50, 51, 52 are corrected using the respective parameters $\alpha$, $\beta$, $\gamma$ and the respective correction amounts are summated to calculate a value for a determination counter (Cnt) used in the stock subtraction processing. After the calculation processing, the routine proceeds to step S1104. The determination counter may also be decided using a predetermined table instead of calculation using a correction parameter.

Next, the consumables stock subtraction processing unit 503 determines whether to perform a stock subtraction processing operation for consumables in response to the current residual amount notification, or determines that the notification is erroneous and that a stock subtraction processing operation will not be performed. An erroneous notification includes a notification due to communication logic limitation of the image formation apparatus itself or notification resulting from removal and re-installing of a consumable by a user.

More specifically, in step S1104, the consumables stock subtraction processing unit 503 calculates a difference between the previous determination counter value for residual amount notification and the current determination counter value for residual amount notification and determines whether or not the calculated difference is greater than or equal to a predetermined value (for example, 2000).

Then in step S1104, when it is determined that a difference between the previous determination counter value for residual amount notification and the current determination counter value for residual amount notification is greater than or equal to a predetermined value (YES in step S1104), the consumables stock subtraction processing unit 503 executes a subtraction processing operation. On the other hand, when it is determined that a difference between the previous determination counter value for residual amount notification and the current determination counter value for residual amount notification is less than a predetermined value (NO in step S1104), the consumables stock subtraction processing unit 503 does not execute a subtraction processing operation. In the present embodiment, a value corresponding to one tenth of the printable sheet number defined for a consumable is set as the predetermined value and when the difference is less than the predetermined value, a subtraction processing operation is not performed.

When it is determined not to perform a subtraction processing operation in step S1104, the consumables stock subtraction processing unit 503 proceeds to step S1108.

Conversely, when it is determined to perform a subtraction processing in step S1104, the consumables stock subtraction processing unit 503 proceeds to step S1105 and executes stock number subtraction processing (consumables stock subtraction processing). This processing flow is performed for each residual amount notification. In the consumables stock subtraction processing, a value of one is subtracted from the stock number X for the consumable stored in the storage apparatus 304.

When subtraction processing is executed, the process proceeds to step S1106. In step S1106, the consumables stock subtraction processing unit 503 determines whether or not as a result of the subtraction processing for the consumable, replenishment of the consumable is required. More specifically, the consumables stock subtraction processing unit 503 compares the value of the notification stock number 1005 stored in the storage apparatus 304 and set in advance on the consumables stock information screen shown in FIG. 10 with the stock number X subtracted in the current step S1105. When the stock number X is less than or equal to the value for the notification stock number 1005, the consumables stock subtraction processing unit 503 determines that the replenishment of the consumable is required. On the other hand, when the stock number X subtracted in the current step S1105 is larger than the value for the notification stock number 1005 set on the consumables stock information screen, the consumables stock subtraction processing unit 503 determines that replenishment of consumable is not required.

When it is determined that replenishment of a consumable is not required in step S1106, the consumables stock subtraction processing unit 503 proceeds to the processing in step S1108.

On the other hand, when it is determined that replenishment of a consumable is required in step S1106, the consumables stock subtraction processing unit 503 proceeds to the processing in the step S1107 and executes notification processing for consumables replenishment. As a result of the stock subtraction processing, when the stock number of the consumable is less than or equal to a threshold value (less than or equal to the notification stock number 1005), the consumables replenishment notification processing provides (arranges) a notification destination preset for the delivery instruction with an instruction (for delivery) to deliver to the delivery destination (not shown) preset for the consumable. In other words, a consumables replenishment notification (delivery instruction) is sent to a preset distribution center, agent or sales company which replenishes consumables.

This notification is carried out by using a communication means such as email or SOAP which suits the system used by the preset distribution center, agent or sales company which replenishes consumables. The means used for communication may be realized in any manner as long as it can be implemented in the CPU 301 and in any storage means among the RAM 302, ROM 303 and storage apparatus 304 in the management apparatus 102. The notification includes information including the consumable type name, number of replacement units (preset) and destination for replacement units (preset). After the consumables stock subtraction processing unit 503 performs the consumable replenishment notification processing, the stock number X for the consumable stored in the storage apparatus 304 is incremented by the replenishment number described above.

Next in step S1108, the consumables stock subtraction processing unit 503 notifies the previously set notification destination (email address 1007 of consumable manager), that consumable replacement is required in the image formation apparatus 101, irrespective of whether or not the consumables replacement notification is executed. Then, the routine proceeds to step S1109.

In step S1109, the consumables stock subtraction processing unit 503 is in standby until receipt of an elimination notification showing that a low residual amount state or a empty of residual amount state output by the image formation apparatus 101 has been eliminated.

The elimination notification is forwarded to the management apparatus 102 when, for example, replacement of the consumable has been determined in the image formation apparatus 101.

In step S1109, when the elimination notification is received, the consumables stock subtraction processing unit 503 proceeds to the processing in step S1110 and prepares to receive the next residual amount notification.

In step S1110, the consumables stock subtraction processing unit 503 decides a counter which is used to determine the stock subtraction processing of the consumable using the same method as step S1103 based on the respective counter values in the counter numbers 50, 51, 52 included in the current elimination notification. In other words, in a similar manner to the residual amount notification, the determination counter is calculated based on the notified counter value.

Next, in step S1111, the consumables stock subtraction processing unit 503 records the determination counter value for stock subtraction processing for consumables calculated as described above in the storage device 304 as a counter for the previous residual amount notification. Then, the process returns to step S1111. This process is repeated thereafter and each time conditions are satisfied, stock subtraction processing for consumables is executed.

In this embodiment, a determination counter value for consumables stock subtraction processing is calculated using the counter value for the counter numbers 50, 51, 52. However, the counter value for the consumables subtraction processing determination may be calculated using the counter value for the counter number 51 and the counter value for the counter number 52. In this case, the following equation holds: "$Cnt=CntB \times \beta + CntC \times \gamma$"

In the present embodiment, clear toner (transparent) is described as an example of a consumable. However, the present invention may also be applied to recording materials having a similar output pattern to clear toner.

For example, in a case of using conventional color toner (CMY or the like), the present invention may execute a subtraction processing determination similar to clear toner by providing a plurality of counters in the image formation apparatus corresponding to the toner consumption amount during printing.

In the present embodiment, toner is used as an example of a consumable. However the present invention may be also applied in a similar manner to an image formation apparatus using another printing method such as ink-jet printing image formation apparatus or a sublimation-type image formation apparatus. In other words, the present invention may execute the same subtraction processing determination by treating a recording material used in the image formation apparatus (ink or ink sheet or the like) as a consumable and by preparing a plurality of counters corresponding to the used amount of the recording material.

As described above, the present embodiment includes an arrangement configured to perform control including stock subtraction processing or calculation of a determination counter in response to the acquisition of a residual amount notification showing a empty of residual amount of the consumable. However, it may be configured to perform control including stock subtraction processing or calculation of a determination counter in response to an acquisition of an elimination notification showing elimination of the empty of residual amount of the consumable.

As described above, due to large deviations in the used amount of recording material depending on the printing mode (pattern of toner consumption as shown in FIG. 8), a counter is provided for each printing mode and the counter for stock subtraction processing determination of the consumable is decided based on each counter value. In this manner, erroneous stock subtraction in the stock processing of the consumable is suppressed and suitable stock processing can be performed.

Thus, a notification in accordance with the residual amount of the consumable recording material used in the stock subtraction processing can be suitably determined in the stock processing of a consumable in an image formation apparatus which can print output patterns having a different used amount compared to normal output.

In the present embodiment, the counter value for the consumables subtraction processing determination is calculated using the respective counter values for the counter numbers 50, 51, and 52. However, the number of printing modes and the number of counters are not limited to 2 or 3 and the present invention may be applied in a similar manner to an arrangement using any number of counters.

In the present embodiment, as described above, the device management unit 402 of the image formation apparatus 101 analyzes the printing mode (illustrated hereafter in FIG. 8) included in the printing job and increments the counter in response to the printing mode. However, the device management unit 402 may calculate the toner use for each printed page or each print job and increment the counter corresponding to the calculated toner use amount. In this arrangement, a corresponding toner use amount is set in advance for each counter.

In the present embodiment, in S1104 in FIG. 11, a difference between a determination counter value at the time of the previous residual amount notification and the current newly notified determination counter value is calculated. Then it is determined whether or not the calculated difference is greater than or equal to a predetermined amount. However, instead of the determination counter value at the time of the previous residual amount notification, it is possible to use a determination counter value at the time of a past residual amount notification (for example, a counter value at the time when consumable stock is previously subtracted). In this case, in step S1104 in FIG. 11, the difference between the determination counter value at the time of past notification (when consumable stock is previously subtracted) and the currently notified determination counter value may be calculated and it is determined whether the calculated difference is greater than or equal to a predetermined value.

In the first embodiment, parameters for respective counters are set manually. On the other hand, according to a second embodiment, parameters can be automatically set for respective counters.

The second embodiment of the present invention will be described with reference to FIG. 12.

FIG. 12 illustrates an example of a consumables detailed information screen according to a second embodiment of the present invention. In FIG. 12, a consumables detailed information screen 1201 differs from the consumables detailed information screen 701 described in the first embodiment (FIG. 7) in that the screen 1201 is provided with a checkbox 1203, which enables selection of whether or not to perform automatic correction in response to the operation of a set parameter.

When the checkbox 1203 is checked, the parameter of the checked counter number is changed to a gray-out state and the parameter cannot be varied manually.

As the initial value of the parameter, consumables information may be retained in advance in the management apparatus 102. Alternatively, after setting a parameter while parameter correction is unchecked, the parameter correction may be checked.

A method of performing automatic parameter correction is described below.

The value for Cnt is calculated with the formula illustrated in FIG. 9 using a residual amount notification, a consumable printable sheet number which is managed in the management apparatus 102 and a printing parameter value. In this case, it is possible that the Cnt value greatly exceeds the printable sheet number of the consumable. In this case, it is clear that the parameter value does not coincide with the used amount of consumables in actual printing.

For example, when the calculated result for Cnt is 25,000 sheets while a printable sheet number is 20,000, the value correcting any of the counter values CntA, CntB, CntC does not match the actual printing.

In this case, as an example, when the proportion of the calculation result to the correction value for each counter is greater than or equal to a fixed amount, e.g., 90%, the parameter for that counter is corrected and changed so that the value for Cnt approaches 20,000. For example, when Cnt greatly exceeds 20,000 (for example Cnt3 greatly exceeds 20,000), the parameter ($\gamma$) is multiplied by "0.8". Furthermore when Cnt is considerably less than 20,000 (for example Cnt1 greatly exceeds 20,000), the parameter ($\alpha$) for that counter is multiplied by "1.2". Parameter values which are corrected in this manner are applicable from a subsequent occasion and when it greatly exceeds a printable sheet number, the processing operation is executed again.

When the Cnt calculation result exceeds the printable sheet number by a large margin and is not biased towards the specified counter, each currently set parameter with respect to all counters is multiplied, for example, by "0.8" and set as the next parameter.

When the Cnt calculation result is considerably less than the printable sheet number and is not biased towards the specified counter (for example, Cnt=1700), each currently set parameter, with respect to all counters is multiplied, for example, by "1.2" and set as the next parameter.

Alternatively, a plurality of parameter groups may be prepared in advance (stored in the storage apparatus 204), and the parameter groups may be varied in a stepwise manner. For example, a first group ($\alpha 1$, $\beta 1$, $\gamma 1$), a second group ($\alpha 2$, $\beta 2$, $\gamma 2$), a third group ($\alpha 3$, $\beta 3$, $\gamma 3$), a fourth group ($\alpha 4$, $\beta 4$, $\gamma 4$), a fifth group ($\alpha 5$, $\beta 5$, $\gamma 5$), a sixth group ($\alpha 6$, $\beta 6$, $\gamma 6$), ... a tenth group ($\alpha 10$, $\beta 10$, $\gamma 10$) of parameters may be stored in the storage apparatus 204. In this case, the following relationship holds between the parameters: $\alpha 1 < \alpha 2 < \ldots < \alpha 5 \ldots < \beta 10$, $\beta 1 < \beta 2 < \ldots < \beta 5 \ldots < \beta 10$ and $\gamma 1 < \gamma 2 < \ldots < \gamma 5 \ldots < \gamma 10$. The fifth parameter group may be used as a default. When the value for Cnt greatly exceeds 20,000, the parameter groups may be varied stepwise in a sequence of fourth group, third group, second group and first group. When the value for Cnt falls much below 20,000, the parameter groups may be varied stepwise in a sequence of sixth group, seventh group, eighth group, ninth group and tenth group.

As described above, in the present embodiment when the calculated value of the determination counter Cnt for consumables stock subtraction is unsuitable, the parameter ($\alpha$, $\beta$, γ) for calculating the determination counter may be varied. Such arrangement enables suitable consumables stock management.

The parameter correction in the present embodiment may be performed simultaneously with the calculation of the determination counter value in step S1103 in FIG. 11 or may be performed, for example, before calculating the determination counter value in step S1110.

A third embodiment of the present invention will be described hereafter with reference to FIG. 13. The first and the second embodiments above describe an arrangement in which consumables information management is performed in the management apparatus 102. The present embodiment provides a monitoring apparatus 103 as shown in FIG. 1.

Figure 13:
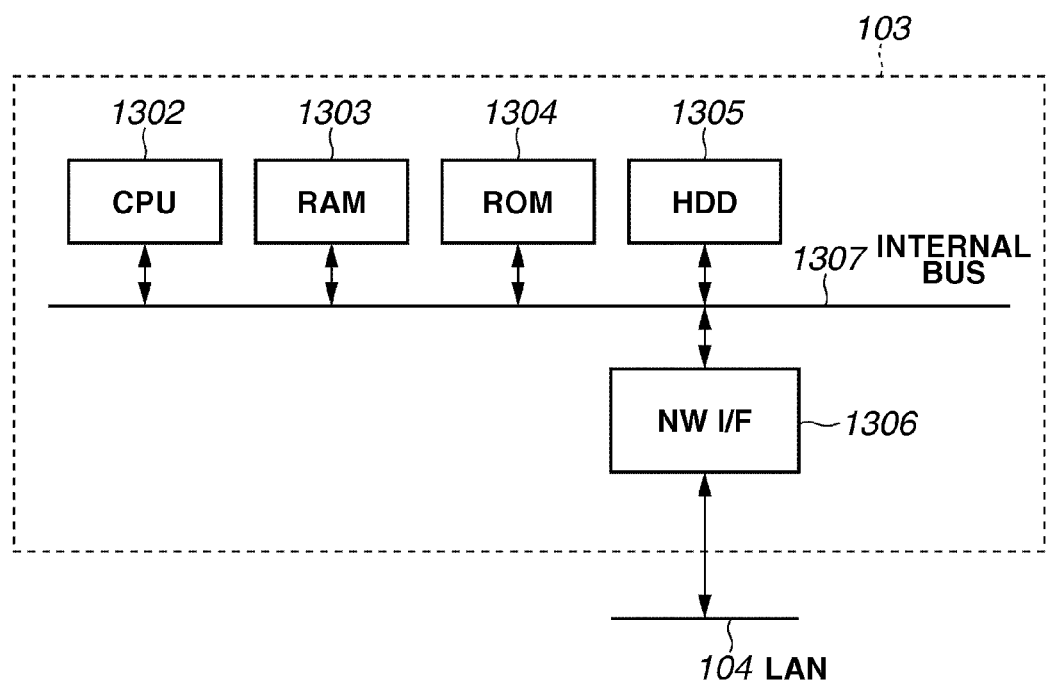
FIG. 13 illustrates an arrangement of a monitoring apparatus provided with an information processing device according to the second embodiment of the present invention.

FIG. 13 illustrates an arrangement of a monitoring apparatus provided with an information processing device according to the present embodiment of the present invention.

The monitoring apparatus 103 is an apparatus configured to monitor the image formation apparatus 101 and, for example, may be applied to an information management apparatus as such as PC, server or the like.

The monitoring apparatus 103 is provided with a CPU 1302 executing programs stored in the ROM 1304 and performs overall control of each apparatus via an internal bus 1307. Various apparatuses including the RAM 1303, the ROM 1304, the storage apparatus 1305 and the network interface 1306 are connected to the internal bus 1307.

The network interface 1306 enables handling of data in both input and output directions with the management apparatus 102 and the image formation apparatus 101 which are connected to an external network, though the network 104. The storage apparatus 1305 functions as an external storage apparatus. The storage apparatus 1305 stores consumables information and detailed information described in the first embodiment and status information, system information and counter information as described above in addition to recording information for the monitored image formation apparatus 101.

The monitoring apparatus 103 is provided with the program to perform processing operations performed by the management apparatus 102 as described in the first embodiment above. image formation apparatus And the monitoring apparatus 103 provides setting functions to be performed from the external information processing apparatus by HTTP and the like.

Alternatively, the monitoring apparatus 103 may perform all of the above processing operations performed by the management apparatus 102 in the first embodiment. More specifically, the monitoring apparatus 103 may calculate counters for consumables subtraction processing through all steps including notification of consumables replenishment based on subtraction processing determination and consumables replacement notification. In this case, the monitoring apparatus 103 includes the same monitoring unit as the management apparatus 102 shown in FIG. 5.

Alternatively, the monitoring apparatus 103 may delegate a part of the above processing operations to the management apparatus 102. For example, the monitoring apparatus 103 may inform the management apparatus 102 that the consumable has been replaced in accordance with the determination processing above (including steps S1101-S1104) and the management apparatus 102 may send notification to the consumables manager and notification to the sales company performing replenishment of consumables.

The monitoring apparatus 103 may receive residual amount notification from the image formation apparatus 101 through the LAN and the USB, for example, and send the received residual amount notification to the external management apparatus 102 through a network or the like.

A fourth embodiment of the present invention will be described hereafter. In the first and the second embodiments above, management of consumables is performed in the management apparatus 102. In the third embodiment, management of consumables is performed using the monitoring apparatus 103 or the monitoring apparatus 103 together with the management apparatus 102.

In the present embodiment, processing performed in the management apparatus 102 or the monitoring apparatus 103 is performed in the image formation apparatus 101. In other words, the image formation apparatus 101 in the present embodiment is configured similar to the management apparatus 102 or the monitoring apparatus 103 shown in the first and second embodiments and the third embodiment. The image formation apparatus 101 can execute the programs similar to the management apparatus 102 and the monitoring apparatus 103 as described with reference to the first and the second embodiments.

The image formation apparatus 101 in the present embodiment has a consumable stock subtraction processing unit 403 and a setting processing unit 404 as shown in FIG. 4.

The consumable stock subtraction processing unit 403 executes the same processing as the consumables stock subtraction processing unit 503 shown in FIG. 5. In other words, the consumable stock subtraction processing unit 403 executes the processing illustrated in the flowchart in FIG. 11.

The setting processing unit 404 executes the same processing as the setting processing unit 504 as illustrated in FIG. 5. In other words, the setting processing unit 404 performs control operations for executing various settings displayed in screens illustrated in FIG. 6, FIG. 7, FIG. 10, and FIG. 12 on an operation panel (not shown) of the image formation apparatus 101.

This arrangement can perform all processing performed by the management apparatus 102 and the monitoring apparatus 103 in the first to the third embodiments in the image formation apparatus 101. Furthermore, the image formation apparatus 101 may delegate a part of processing operations to the management apparatus 102 and the monitoring apparatus 103 in the same manner as the third embodiment.

As described above, the present embodiment also enables suitable stock management by suppressing errors (duplication) in consumables stock subtraction processing during consumables stock processing in an image formation apparatus even when printing processing is performed in which a consumption amount of a consumable widely varies depending on an output pattern.

In other words, even when stock management of clear toner, for example, which has specific output patterns (toner consumption amount patterns) is performed, errors (duplication) of stock subtraction processing of a consumable (such as clear toner) can be suppressed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

The present invention can also be realized by executing the following process. That is, a process in which software (program) that realizes the functions of the above-described embodiments is supplied to the system or apparatus via a network or a recording medium of various types, and then a computer of the system or apparatus (or devices such as CPU or MPU) reads out the program and executes it. In such a case, the recording medium where the program is stored as well as the program is included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-015319 filed Jan. 27, 2009, which is hereby incorporated by reference herein in its entirety.

What is claimed is:

1. A method in a management system configured to manage stock of a consumable used in an image formation apparatus, the method including:
   acquiring, using a processor, a plurality of residual amount notifications in accordance with a residual amount of a specified recording material in the consumable disposed in the image formation apparatus;
   deciding, by the processor, a counter value used in a determination of stock subtraction for the consumable using a first counter value and a second counter value upon acquiring each of the residual amount notifications, a first counter value being notified together with each of the acquired residual amount notifications and indicating a sheet number of images formed by using the recording material in the image formation apparatus in a first mode, and a second counter value being notified together with each of the acquired residual amount notifications and indicating a sheet number of images formed in a second mode using a more amount of the recording material than in the first mode using the recording material in the image formation apparatus;
   determining, using the processor, whether a difference of the decided counter value upon acquisition of a previous residual amount notification of the acquired plurality of residual amount notifications and the decided counter value upon acquisition of a current residual amount notification of the acquired plurality of residual amount notifications is greater than or equal to a predetermined value; and
   performing, using the processor, stock subtraction processing on the consumable when the determining step determines that the difference is greater than or equal to the predetermined value,
   wherein in the deciding step, for each of the residual amount notifications: a value calculated by multiplying a first parameter by the first counter value notified together with the residual amount notification is added to a value calculated by multiplying a second parameter by the second counter value notified together with the residual amount notification and, the value obtained by the addition is decided as the counter value used in determination of the stock subtraction.

2. The method according to claim 1, wherein the residual amount notification indicates at least one of a low residual amount, an empty residual amount, elimination of a low residual amount, and elimination of an empty residual amount of the recording material in the consumable.

3. The method according to claim 1, further comprising setting, using the processor, the first parameter and the second parameter.

4. The method according to claim 1, wherein the recording material is an material for adjusting a level of glossiness, the first mode is a mode of partially outputting the recording material onto a sheet, and the second mode is a mode of outputting the recording material onto a whole surface of the sheet.

5. The method according to claim 4, wherein the first mode is a mode of superimposing and outputting the recording material onto an image section recorded on the sheet.

6. A non-transitory computer readable storage medium on which is stored a computer program for making a processor execute a method for managing a store of a consumable used in an image formation apparatus, the method comprising:
   acquiring, using a processor, a plurality of residual amount notifications in accordance with a residual amount of a specified recording material in the consumable disposed in the image formation apparatus;
   deciding, using the processor, a counter value used in a determination of stock subtraction for the consumable using a first counter value and a second counter value upon acquiring each of the residual amount notifications, a first counter value being notified together with each of the acquired residual amount notifications and indicating a sheet number of images formed by using the recording material in the image formation apparatus in a first mode, and a second counter value being notified together with each of the acquired residual amount notifications and indicating a sheet number of images formed in a second mode using a more amount of the recording material than in the first mode using the recording material in the image formation apparatus;
   determining, using the processor, whether a difference of the decided counter value upon acquisition of a previous residual amount notification of the acquired plurality of residual amount notifications and the decided counter value upon acquisition of a current residual amount notification of the acquired plurality of residual amount notifications is greater than or equal to a predetermined value; and
   performing, using the processor, stock subtraction processing on the consumable when the determining step determines that the difference is greater than or equal to the predetermined value,
   wherein in the deciding step, for each of the plurality of residual amount notifications: a value calculated by multiplying a first parameter by the first counter value notified together with the residual amount notification is added to a value calculated by multiplying a second parameter by the second counter value notified together with the residual amount notification and, the value obtained by the addition is decided as the counter value used in determination of the stock subtraction.

* * * * *